(12) United States Patent
Hyzin et al.

(10) Patent No.: US 6,746,159 B2
(45) Date of Patent: Jun. 8, 2004

(54) MULTI-FIBER INTERCONNECT SYSTEM

(75) Inventors: Peter Joseph Hyzin, Trabuco Canyon, CA (US); Can Trong Nguyen, Garden Grove, CA (US); James Edward Novacoski, Yucaipa, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 434 days.

(21) Appl. No.: 09/781,887

(22) Filed: Feb. 9, 2001

(65) Prior Publication Data

US 2001/0012427 A1 Aug. 9, 2001

Related U.S. Application Data

(63) Continuation-in-part of application No. 09/170,147, filed on Oct. 12, 1998.

(51) Int. Cl.[7] .................................................. G02B 6/36
(52) U.S. Cl. ....................................................... 385/80
(58) Field of Search ..................................... 385/80, 55

(56) References Cited

U.S. PATENT DOCUMENTS

| 5,150,516 | A | * | 9/1992 | Boero et al. .................... 29/877 |
| 5,420,952 | A | | 5/1995 | Katsura et al. ................ 385/80 |
| 5,778,121 | A | * | 7/1998 | Hyzin ........................... 385/55 |
| 5,790,762 | A | * | 8/1998 | Aepli et al. ..................... 385/80 |
| 5,815,621 | A | * | 9/1998 | Sakai et al. .................... 385/80 |

* cited by examiner

Primary Examiner—Frank G. Font
Assistant Examiner—Andrew H. Lee
(74) Attorney, Agent, or Firm—Roger C. Turner

(57) ABSTRACT

First and second connector housings (20, 26) each hold a corresponding set (22, 30) of numerous fibers, that are coupled when their tips (40, 42) abut, in a low-cost and rugged arrangement. The housings are identical and each has numerous bores (50, 52) extending to a mating face (34, 36). Each fiber is fixed in position in one of the bores, by potting material (64). The diameters of the bores are only slightly greater than the diameters of the fibers, so the potting material helps center the fiber in the end of the bore that lies adjacent to the mating face.

2 Claims, 4 Drawing Sheets

MULTI-FIBER INTERCONNECT SYSTEM

CROSS-REFERENCE

This is a continuation-in-part of U.S. patent application Ser. No. 09/170,147 filed Oct. 12, 1998.

BACKGROUND OF THE INVENTION

There have been numerous systems for connecting the ends of two optical fibers, with the greatest transmission efficiency usually obtained by having the tips of the two fibers abut one another. High transmission efficiency generally requires that the tips of the fibers be polished precisely flat, that the fibers be accurately aligned, and that the tips substantially abut one another with a gap everywhere along the faces of the fibers being less than one-thousandth inch. The most common approach has been to insert the pair of fiber tips into a cylindrical bore of a ferrule, and to use a spring to bias one fiber tip against the other. When a large number of fiber pairs are to be connected, a large number of springs are required to individually bias the fiber tips, resulting in a complex arrangement with many moving parts and less than high reliability. U.S. Pat. No. 5,533,157 shows a sheet of metal forming a plurality of leaf springs that each bias a separate fiber, but this still results in numerous leaf spring portions that each constitutes a moving part. A system for connecting the ends of multiple pairs of optical fibers, which enabled high efficiency transmission of light in a simple and rugged system, would be of value.

SUMMARY OF THE INVENTION

In accordance with one embodiment of the present invention, an optical fiber system is provided for efficiently connecting pairs of optical fibers, which is of a simple and rugged design. The system includes first and second housings, that each has a plurality of parallel fiber-receiving bores extending to a mating face of the housing. First and second sets of optical fibers are mounted respectively in the first and second housings, with each fiber extending through a bore and rigidly fixed in place in the bore. The mating face of each housing is polished precisely flat, and the fibers that extend through bores in that housing have tips that are polished flat and that are precisely flush with the mating face. When the two housings are brought together so their mating faces lie facewise against each other, each fiber tip is precisely aligned with a fiber tip of the other housing, and the two tips substantially abut each other, with a gap between them of less than 0.0005 inch, for high efficiency transmission of light between the two fibers.

Each fiber is fixed in place by a quantity of potting material such as epoxy. The potting material extends to the mating face and is polished flat and precisely flush with the mating face. The bores merge in a cavity at the rear of the housing, and the quantities of potting material merge into a large amount of potting material in the cavity. The first and second housings are identical, and each has a groove around the mating face, with an elastomeric seal lying in the groove. When the housings are brought together, the seals press against each other to seal the area where the mating faces engage each other.

Each housing has opposite ends with flanges, with a pair of holes in the flanges lie at opposite sides of the housing. A pair of panel screws each lies in a hole of a different flange, with the panel screws lying catercorner from each other. A pair of connecting screws for connecting the two housings, lie in holes of the second housing flanges in another catercorner arrangement.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
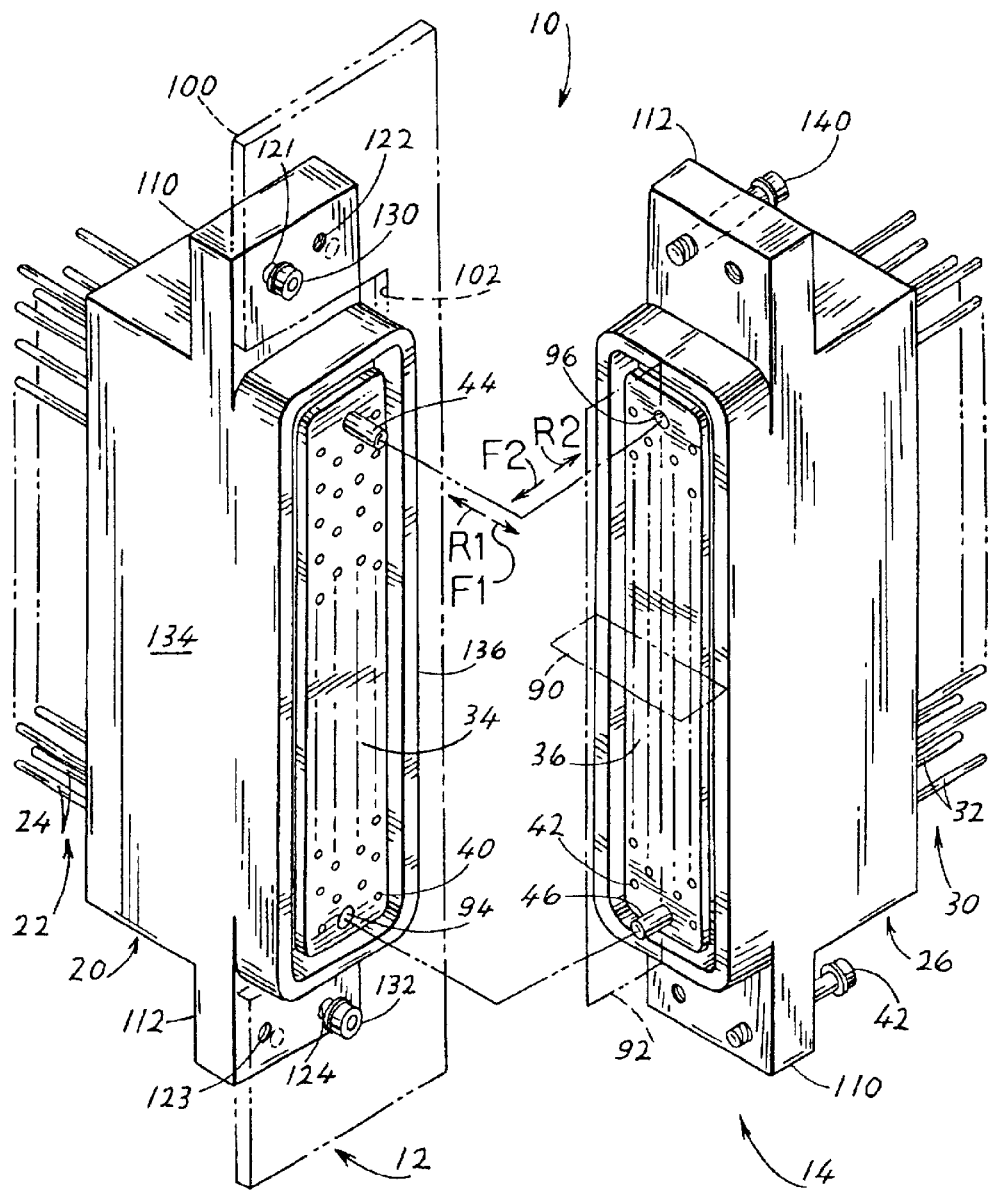
FIG. 1 is an exploded isometric view of the optical connector system of the present invention, with the two connector arrangements being separated.

FIG. 1 illustrates an optical connecting system 10 which includes first and second connector arrangements 12, 14. The first connector arrangement 12 includes a first housing 20 and a first set 22 of optical fibers 24. The second connector arrangement 14 similarly includes a second housing 26 and a second set 30 of optical fibers 32. Each set of optical fibers includes a plurality of fibers (at least 2) and usually a multiplicity of fibers (at least 7). Each of the housings 20, 26 has a mating face 34, 36. Each of the first fibers 24 has a tip 40 that is flush with the mating face 34. The second fibers 32 also have tips 42 flush with the corresponding mating face 36. The two connector arrangements are connected by moving their mating faces 34, 36 facewise against each other. Alignment pins 44, 46 precisely align the two housings so the tip 40 of each of the first fibers is precisely aligned with the tip 42 of the corresponding one of the second fibers. In order to aid in the description of the invention, forward and rearward longitudinal directions F1, R1 are defined for the first connector arrangement 12, while forward and rearward longitudinal directions F2, R2 are defined for the second connector arrangement 14.

Figure 2:
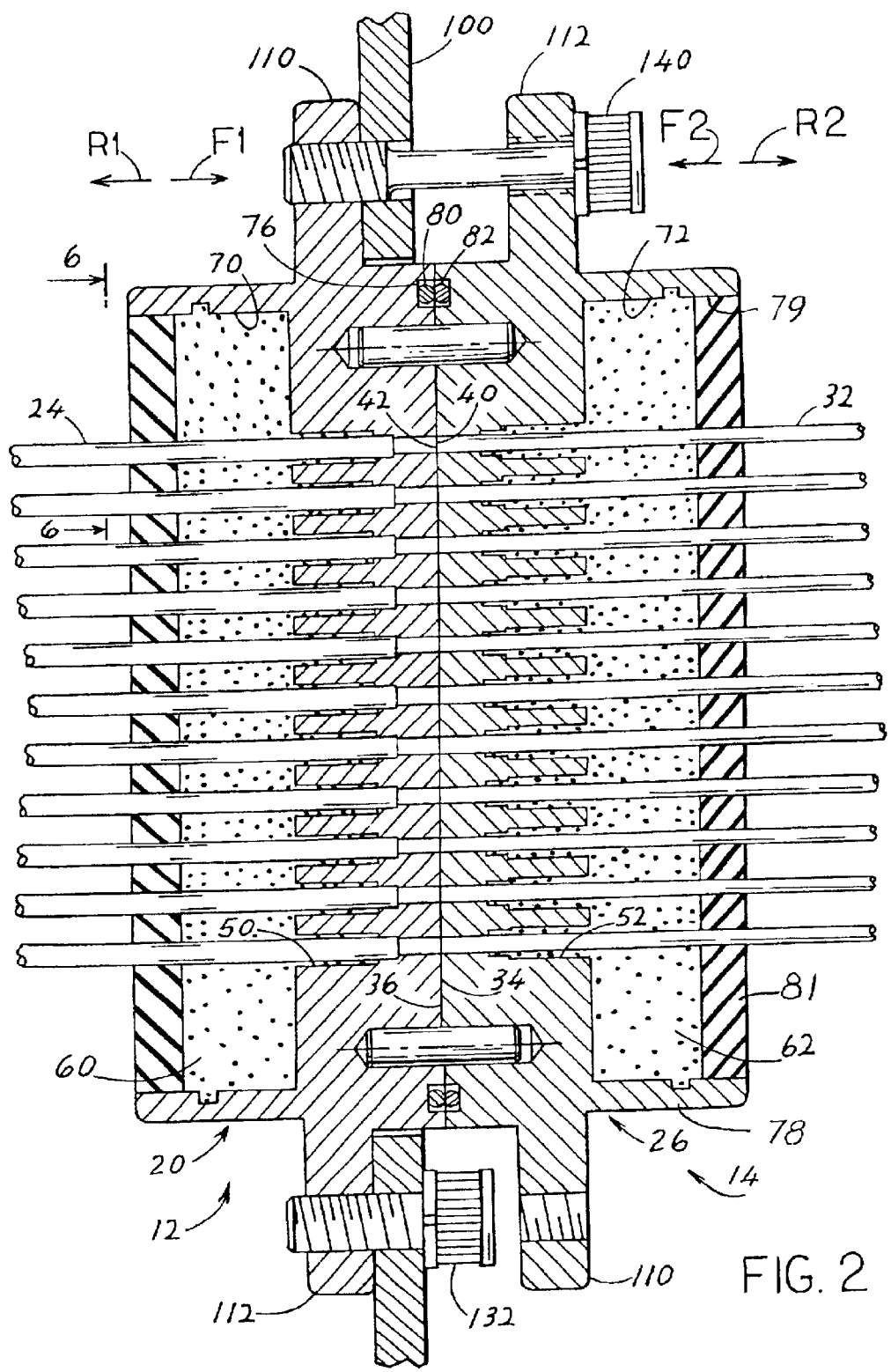
FIG. 2 is a sectional view of the connector system of FIG. 1, with the two connector arrangements being mated with their mating faces lying facewise against each other.
Figure 7:
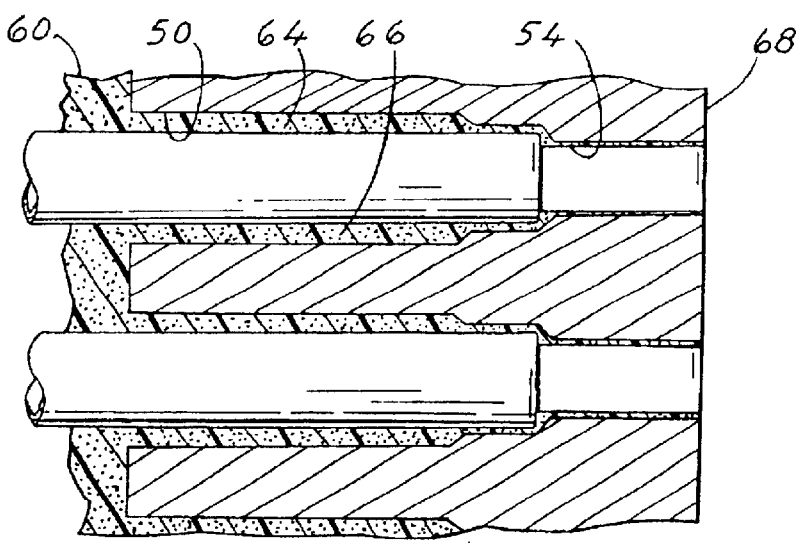
FIG. 7 is an enlarged view of a portion of the system of FIG. 2.

FIG. 2 shows the two connector arrangements 12, 14 fully mated, with the mating faces 34, 36 of the two connector housings lying facewise against each other, and with the tips 40, 42 of the first and second fibers being precisely aligned and abutting each other. Each housing has a plurality of bores 50, 52 leading to the corresponding mating face 34, 36 of that housing. The fibers 24, 32 lie in those bores. As shown in FIG. 7, each bore has a forward end portion 54 which very closely surrounds the corresponding fiber. Potting material 60 fixes the fibers in place. The potting material 60 includes an individual quantity such as 64 that fixes a corresponding fiber to the walls of a corresponding bore. The quantity 64 merges at the rear portion of the connector into the mass 60. FIG. 2 shows that each connector includes a cavity 70, 72 that connects to all of the bores, and that connects to all of the quantities of potting materials lying in the bores.

Each of the connector arrangements is constructed by first filling the corresponding cavity and bores with a potting material in a fluid state, with epoxy being preferred. The housing has walls, including side walls 78, that close the cavity except for its rear end. With the rear end 79 of the cavity lying uppermost, the fibers are threaded through the rear of the corresponding connector housing and forwardly through the bores. The fibers are moved forwardly until their extreme front ends project considerably forward of the mating face of the connector housing, such as perhaps one inch forward of the face. All of the fibers are then cut off so they project only a small distance forward of the face. Applicant prefers to have a stress relief grommet 81 lie rearward of the housing while the cavity is filled with epoxy, and to later slide the grommet along the fibers to the positions shown.

Figure 5:
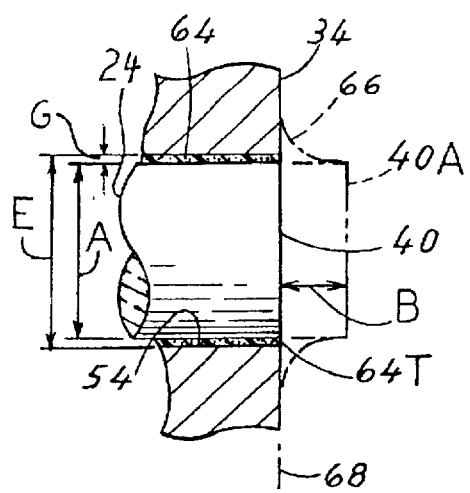
FIG. 5 is an enlarged view of the tip of an optical fiber and the surrounding areas of the housing mating face and the potting material.
Figure 6:
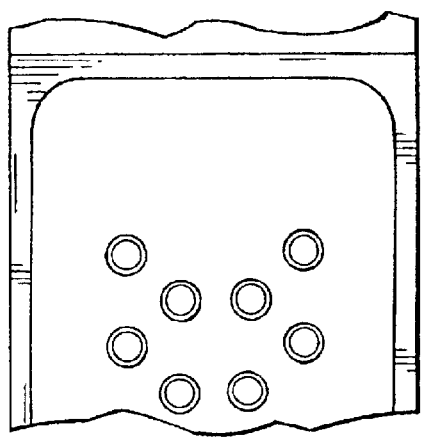
FIG. 6 is a view taken on line 6—6 of FIG. 2, but without the strain relief grommet, potting material or fibers in place.

FIG. 5 shows the fiber ends 40A lying forward of the mating face 34 after they have been cut. During the time when the fibers were projected through the epoxy to lie forward of the housing mating face, the fibers were wetted, which assures that a quantity 64 of potting material completely surrounds the fiber. The potting material not only fixes the fiber, but also helps to center the fiber within the corresponding bore front end 54. The fiber tips at 40A are preferably cut off at a position where a meniscus 66 of the potting material reaches. In one example, the plastic fibers 24 that are used have diameters A of 1.5 mm and the tips at 40A project by a distance B of one quarter diameter, or about 0.4 mm forward of the mating face 34. The fiber tips at 40A, the meniscus of epoxy 66 and the mating face 34 of the housing are then ground and polished to a precisely flat configuration, with the eventual tip 40 of the fiber and the tip 64T of the epoxy lying flush with the mating face 34 of the housing and lying in a common optical plane 68.

The bore front end portion 54 should have a diameter E less than twice the fiber diameter A. Otherwise, in a worst case scenario, as when one tip lies at the bottom of its bore and a mating tip lies at the top of its bore, then the tips would not abut anywhere. Applicant prefers to use surface tension of the liquid polymer to center the fiber in the bore end portion. However, it is possible to position a tip at the axis of its bore front end portion by other means such as a template, but this is generally not desirable. It is preferable that the diameter of the bore end portion be no more than 110% of the diameter A of the fiber. The tendency of the liquid but viscous epoxy or other potting material to center the fiber within the bore decreases as the clearance G between fiber and bore increases, and its effect becomes minimal when the ratio E/A becomes more than 110%. Applicant prefers a ratio E/A of no more than 102% for a strong centering force and efficient coupling of light. In a connector that applicant has designed, the fiber has a diameter A of 1.49 mm (58.5 mils, where one mil equals ¹⁄₁₀₀₀th inch) to 1.50 mm (59.0 mils). The bore front end portion has a diameter of 1.5 mm (59.0 mils) to 1.51 mm (59.5 mils). In a case of largest clearance, the ratio E/A would be 1.51/1.49, or 101.3%.

Figure 4:
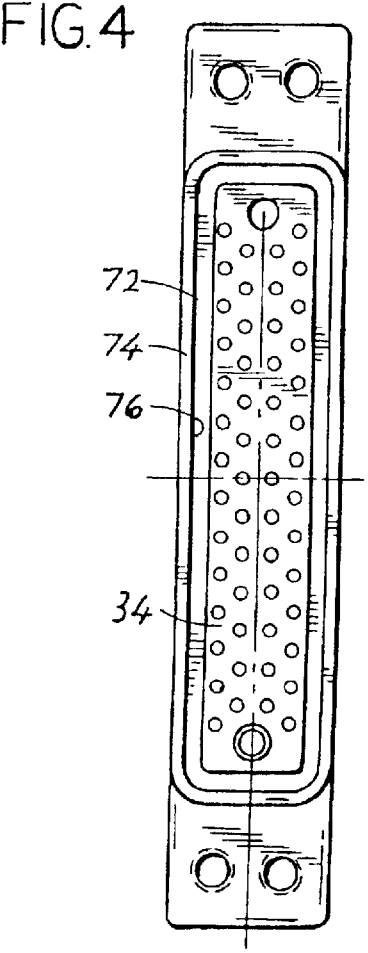
FIG. 4 is a view taken on line 4—4 of FIG. 3.
Figure 8:
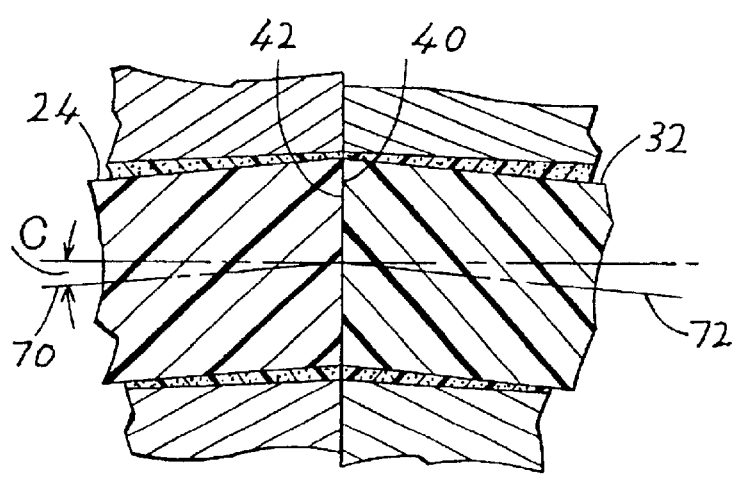
FIG. 8 is a view of a portion of FIG. 7, but with the axes of mating fibers grossly misaligned.

FIG. 4 shows that the particular connector housing that applicant has constructed and successfully tested, had four rows of bores, for a total of 54 bores. If the prior art arrangement were used, wherein a separate spring or spring portion is provided for each fiber of a connector, then the system would not be as reliable as the system of the present invention. The present invention avoids the need for fibers to slide or for spring portions to bias them. Instead, applicant relies upon the fact that surfaces can be ground and polished flat with high precision. The fact that the tips of the fibers, which are rigidly fixed in the housing, have been polished flat at the same time as the surrounding housing mating face was polished flat, results in high precision abutment of a pair of corresponding fibers. Even though the plane of the tips of applicant's optical fibers cannot be exactly perpendicular or normal to the axes of the fibers, they will lie very close to the corresponding fibers that they abut. FIG. 8 shows the two fibers 24, 32 with the angle C between the face of a fiber and the axis 70 of that fiber being greatly exaggerated. Although the axes 70, 72 of the two fibers are not precisely aligned, their faces 40, 42 will closely abut one another. The area of each mating face 40, 42 is preferably at least 50 times and more preferably at least 100 times the area of each fiber tip, to assure that the two mating faces are easily held precisely facewise against each other. For fibers of a diameter of 1.5 mm, the maximum gap between the tips 40, 42 would be no more than 0.0005 inch (0.01 mm).

FIG. 4 shows that each connector has a peripheral portion 72 that surrounds the mating face 34 of the connector. The peripheral portion includes a peripheral wall 74 and a peripheral groove 76 between the peripheral wall and that mating face 34. An elastomeric seal lies in the groove 76. The seal extends in a closed loop along the entire groove. FIG. 2 shows first and second seals 80, 82 lying in grooves 76 of the first and second housing. When the connectors mate, the elastomeric seals 80, 82 are compressed against each other, and seal the volume where the mating faces 34, 36 lie facewise against each other and where the tips of the fibers abut one another.

The two connector housings 20, 26 of FIG. 1 are identical but are oriented upside-down from each other. Each housing is symmetric about first and second planes 90, 92. This not only reduces the cost for manufacture, but also aids in mating a pair of connector arrangements because they do not have to be of different types. The two connectors are mated with the alignment pin 44 of one being uppermost and the alignment pin 46 of the other being lowermost, so each alignment pin can enter a corresponding precision alignment hole 94, 96 of the other connector housing.

In many if not most cases, one of the housings such as the first one 20 is mounted on a panel 100. Each housing has opposite ends and has a flange 110, 112 at each end. Each flange has a pair of holes, the four holes being numbered 121–124. A pair of panel mount screws 130, 132 extends through a panel hole and through one of the flange holes. The two panel screws 130, 132 are mounted catercorner, with one, 130 lying near a first side 134 of the housing and the other 132 mounted near the opposite second side 136 of the housing. The second connector is provided with a pair of connecting screws 140, 142. The connecting screws are installed so they do not come out of the flange holes. The connecting screws are mounted catercorner on the flanges 110, 112 of the second housing, so they can be aligned with holes not receiving the mounting screws 130, 132. Each connecting screw 140 extends through a panel hole and into a corresponding hole 122, 123 of the flanges of the first connector housing. Each of the holes 121–124 is preferably threaded to enable the screws to connect to the flange by threading into the corresponding flange holes. FIG. 2 shows how a connecting screw 140 and a panel screw 132 are mounted in place. This arrangement of the screws enables rapid mounting of one connector on a panel and assurance that the mating connector can be rapidly connected to the first connector.

Figure 3:
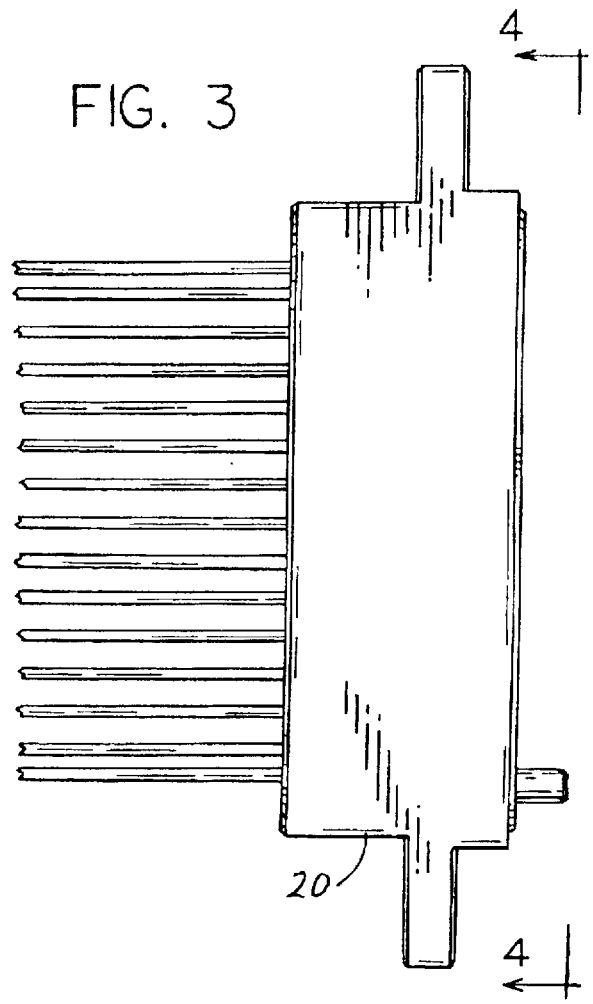
FIG. 3 is a side elevation view of one of the connector arrangements of FIG. 1.

In a connector system of the above-described type that applicant constructed and tested, the housings have mating faces of a width of 9.2 mm and a length of 47.9 mm, with other dimensions proportional as shown in FIGS. 2, 3, and 4. The area of each mating face is 440 mm², which is 250 times the area (1.76 mm²) of one fiber tip. In tests that applicant has conducted on the above-described optical connector system, applicant found that when the system operated dry (no index-matching fluid between the mating faces) the transmission efficiency was 92%. When an index matching fluid was applied to the mating faces, the coupling efficiency was increased to 96%. The fibers were used to carry light for illumination purposes.

Thus, the invention provides an optical connector system which is of simple and rugged construction, and which enables a large number of pairs of optical fibers to be coupled by abutment of their tips. Each of a pair of housings has bores which receive a corresponding optical fiber end, the fiber being fixed in place therein preferably with a potting material which sets (becomes solid) after the fiber is projected forward of the housing mating face. The fiber ends, potting material, and housing mating face are all ground and then polished so the mating face and the tips of the fibers lie precisely on a common plane. When the housings are connected with their mating faces lying facewise against each other, the fiber tips abut one another, with a gap of less than 0.0005 inch between adjacent tips. A screw arrangement for mounting one housing on a panel and the other housing on the first, includes panel screws at catercorners of flanges of the first housing and connecting screws at opposite catercorners of the second housing.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An optical connector system for connecting together the ends of first and second sets of optical fibers that each includes a plurality of optical fibers that each have tips, comprising:

first and second housings that each has a mating face and that each has a plurality of parallel fiber-receiving bores extending in a longitudinal direction through the corresponding housing to the mating face thereof, with each bore having a front end portion that extends to the mating face of the housing, with said fibers of said first set each extending through a different one of said bores of said first housing and with said fibers of said second set each extending through a different one of said bores of said second housing, with each fiber having an end fixed in position in the corresponding bore;

for each of said housings, the tip of the fiber lying in the housing and the mating face of the housing, lie precisely flush and in a common optical plane;

a quantity of potting material lying in each of said bore front end portions and around a fiber portion that lies in the bore front end portion;

each of said bore front end portions has an inside diameter that is less than twice the outside diameter of the fiber portion lying therein;

said first and second housings are substantially identical, with each housing having opposite first and second sides and having first and second opposite flanges with first and second holes in each flange wherein each first hole lies closest to said first side and each second hole lies closest to said second side;

a pair of panel mount screws, each lying in the first hole in a first of said flanges and the second hole in the second of said flanges of first housing, for mounting said first housing on a panel.

2. An optical connector arrangement, comprising:

a first housing having front and rear ends, with said front end forming a first planar mating face, said first housing having a plurality of parallel bores with front portions opening to said mating face;

a first set of a plurality of optical fibers that each extends through one of said bores, with each fiber having an end portion with a tip lying at said mating face;

a plurality of first quantities of set potting material each lying in one of said bores and around the end portion of the fiber lying in the bore;

said mating face lying precisely in a plane and said fiber tips all lying in said plane and flush with said mating face;

said bore front portions each has an inside diameter no more than 110 % of the outside of the corresponding fiber;

a second housing which is identical to said first housing, and which has a second planar mating face, a second set of a plurality of optical fibers lying in bores of said second housing and having fiber tips precisely flush with said second mating face, and a plurality of second quantities of set potting material each lying around an end portion of one of said second fibers that lie in said bores of said second housing;

said first and second housings being fastened together with their faces lying facewise against each other;

a panel which has a connector-holding area with opposite area ends, with a pair of panel through holes in each area end;

each of said housings has opposite ends with flanges at said opposite ends and with a pair of holes in each flange, each pair of holes including first and second holes lying adjacent to said first and second sides, respectively, and each pair of holes of a flange of said first housing being aligned with a pair of holes of a flange of said second housing;

a pair of panel screws each extending through one of said panel holes and through one of said flange holes of said first housing, with a first of said panel screws extending through the first hole in a first of said flanges and through the second hole in a second of said flanges;

a pair of housing connect screws each extending through one of said panel holes and through a hole in a flange of said first connector and through a hole in a flange of said second connector, including a first connect screw that extends through the second hole in said first flange of said first housing and a second screw that extends through the first hole in the second flange of said first housing.

* * * * *